Figure 1:
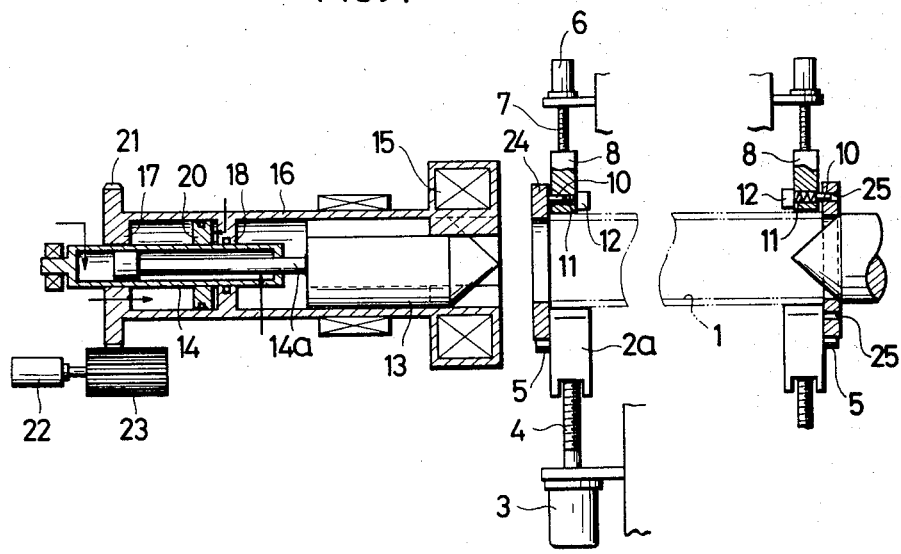

United States Patent [19]
Hirose et al.

[11] 3,837,061
[45] Sept. 24, 1974

[54] APPARATUS FOR POSITIONING A FLANGE

[75] Inventors: Kiyoshi Hirose; Kaoru Shiozawa, both of Chibaken; Yuzi Saito, Kanagawaken, all of Japan

[73] Assignee: Mitsui Shipbuilding and Engineering Co., Ltd., Tokyo, Japan

[22] Filed: May 24, 1973

[21] Appl. No.: 363,528

[30] Foreign Application Priority Data
May 31, 1972  Japan ........................... 47/54722

[52] U.S. Cl. .............................................. 29/200 P
[51] Int. Cl. ............................................ B23p 19/00
[58] Field of Search ............ 29/200 P, 200 J, 200 R, 29/211 M

[56] References Cited
UNITED STATES PATENTS
3,739,451  6/1973  Jacobson ............................ 29/200 J

*Primary Examiner*—Thomas H. Eager
*Attorney, Agent, or Firm*—Howson and Howson

[57] ABSTRACT

Apparatus for positioning a bolt hole of a flange to be welded to one end of a pipe relatively to another flange at the other end of the pipe comprising means for supporting and rotating the flange, a pin adapted to be inserted into one of the bolt holes of the flange, means for detecting the inserted pin in rotation of the flange, and means for stopping the rotation of the flange in response to said detecting of pin insertion, and the flange being further rotated an angle if necessary.

1 Claim, 2 Drawing Figures

APPARATUS FOR POSITIONING A FLANGE

The present invention relates to an apparatus for positioning a flange to be welded to a pipe in a flange welding machine. The flange has bolt holes through which bolts pass to connect another flange or equipment. Bolt holes at flanges of opposite ends of a pipe must be in a standardized relative position.

The object of the present invention is to provide an apparatus which accurately positions the flange to the regulated position.

Figure 2:
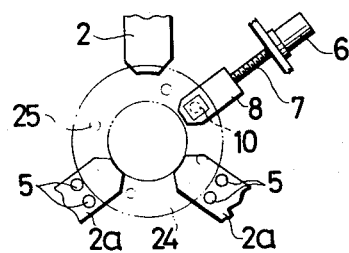

In the drawings:

FIG. 1 is a sectional side view of the flange positioning apparatus in accordance with the present invention; and FIG. 2 is a front view of gripping jaws used therein.

Referring to the drawings, two sets of triplets of radial jaws such as 2, 2a and 2a are provided at opposite sides of the flange welding machine to grip the pipe 1. Each jaw engages a feeding screw 4 of a respective step motor 3 so as to be radially moved. On the outer side of each lower jaw 2a are provided two pins 5 on which a flange may be supported. Between the jaws of each set, a supporting member 8 is provided to be radially moved by a screw 7 connected to a step motor 6. A pin 10 engageable with a bolt hole of the flange is provided on the supporting member 8 and urged outwardly by the spring 11. The rear end of the pin 10 is connected to the limit switch 12 for actuation of the switch. A pair of centers 13 coaxial with the pipe 1 are provided and each center is adapted to be axially moved in the cylinder 16 by the piston rod 14a of an air cylinder 14. Since the hereinafter described means at opposite ends of the pipe have same construction, the right hand means are omitted in the drawing. The air cylinder 14 is secured to the machine body and slidably engaged with the cylinder 16. An electro magnet 15 is provided on the end of the cylinder 16 and engaged with the center 13 to permit it to slide. The cylinder 16 has a chamber enclosed by end plates 17 and 18 and the chamber is divided into two chambers by the disk 20 secured to the air cylinder 14. The gear 21 provided on the cylinder 16 is engaged with the pinion 23 coupled to the step motor 22. Therefore, when the step motor 22 is driven, the pinion 23 rotates the gear 21 and hence the cylinder 16 and the center 13.

All jaws 2 and 2a are located at radially retired positions at first, and lower jaws 2a are advanced radially inward by step motors according to pulses corresponding to the diameter of the flange to be welded, to a position where pins 5 may hold the flange. The upper jaw 2 is located at a position where the side face of the jaw will be contacted to the side face of the flange. The member 8 is advanced by the step motor 6 to a position where the pin 10 may be inserted into a bolt hole of the flange.

Thereafter, a flange 24 is dropped onto pins 5 along jaws and supported on the pins with the center of the flange in slightly lower position than the axis of the pipe. Then, the center 13 is advanced by the rightward movement of the piston rod 14a of the air cylinder 14, so that the center is inserted into the center hole of the flange as shown in right half of FIG. 1 to press the flange to the side face of jaws 2a. Thus the flange is accurately aligned with the axis of a pipe to be welded. Thereafter, the cylinder 16 is rotated by the step motor 22 and hence the center 13 and the flange 24 are also rotated. When one of bolt holes 25 of the flange coincides with the pin 10, the pin is inserted into the bolt hole by the spring 11 so that the flange is stopped by the pin. Thus, both flanges of the opposite ends of the pipe 1 are located in the positions determined by the pins 10. Movement of the pin 10 causes the limit switch 12 to be actuated to emanate an electrical signal which means that the flange has been stopped, and the step motor 22 is stopped by the signal. Subsequently, the cylinder 16 is moved to the right by introducing air into the right side chamber of the cylinder, whereby the electro magnet 15 abuts on the flange to attract it, after which the electro magnet is returned with the attracted flange. Then, if necessary, the step motor 22 of one side is rotated a predetermined angle by signals to rotate the electro magnet 15 and the flange, thus bolt holes of the flange are located in the position determined relatively to the other side flange. The member 8 is returned and lower jaws 2a are moved to a proper position for supporting a pipe to be welded. The pipe 1 is carried on the jaws 2a and the upper jaw 2 is lowered to grip the pipe. Thereafter, the center 13 and the electro magnet 15 are advanced to contact the flange to the end of the pipe and the flange is welded to the pipe by a not shown welding machine. When all jaws are opened, the pipe with flange is dropped out and introduced to a next working step.

What is claimed is:

1. Apparatus for positioning a flange having one or more bolt holes therein comprising means for rotatably supporting a flange, means for rotating the flange, a spring biased pin to engage with one of the bolt holes of the flange, a supporting member for the pin, means for moving the supporting member to a position where the pin can be inserted into a bolt holes of the flange, a switch adapted to be actuated by the inserted pin, and means for stopping said rotating means by the actuation of said switch.

* * * * *